Figure 1:
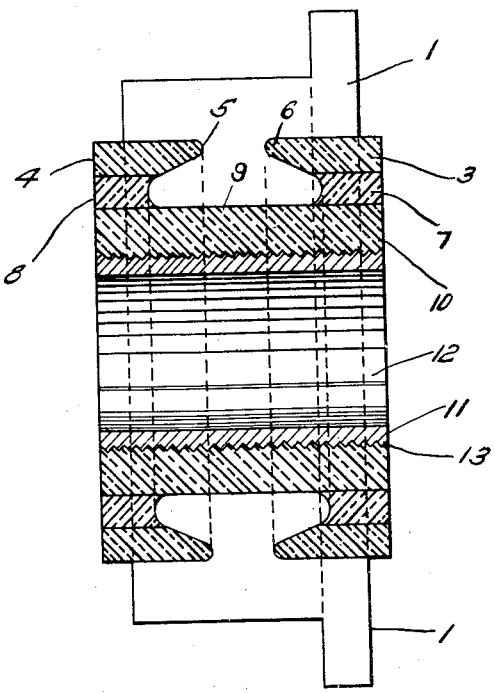

Oct. 14, 1924.

A. J. BASTIAN

COMMUTATOR CYLINDER

Filed Jan. 31, 1921

1,511,316

WITNESSES:
K. C. Clowes.
W. B. Jaspert.

INVENTOR
Arthur J. Bastian
BY
Wesley G. Carr
ATTORNEY

Patented Oct. 14, 1924.

1,511,316

UNITED STATES PATENT OFFICE.

ARTHUR J. BASTIAN, OF WILKINSBURG, PENNSYLVANIA, ASSIGNOR TO WESTINGHOUSE ELECTRIC & MANUFACTURING COMPANY, A CORPORATION OF PENNSYLVANIA.

COMMUTATOR CYLINDER.

Application filed January 31, 1921. Serial No. 441,279.

*To all whom it may concern:*

Be it known that I, ARTHUR J. BASTIAN, a citizen of the United States, and a resident of Wilkinsburg, in the county of Allegheny and State of Pennsylvania, have invented a new and useful Improvement in Commutator Cylinders, of which the following is a specification.

This invention relates to commutator cylinders for dynamo-electric machines more especially to molded commutator cylinders of the type wherein the commutator bars are held in place by a molded insulating compound, such as a phenolic condensation product.

Heretofore, the molding mixtures utilized in commutator cylinders consisted of shredded fibres, fuller's earth, sawdust and the like, compounded with a fusible phenolic condensation product. The commutator bars were inserted in the matrix of a mold and the molding compound was filled in around them. Heat and pressure were applied, causing the molding compound to first become plastic and to fill in all interstices or openings between and around the bars, and then to compact and harden the mass, forming a coherent, unitary structure.

This type of structure, although sufficiently strong for small commutator cylinders, was mechanically weak for large machines, and various means for reinforcing the molded structure with steel or metal reinforcing members have been proposed. The usual method of construction was to mold metal rings in the insulating body portion of the commutator cylinder and spaced from the conductor members by the molding compound. Difficulties were encountered in placing the metal rings in the proper positions in the mold, there being a tendency for them to become displaced during the molding operation, and, since the space between the commutator bars and these reinforcing rings was usually very small, even the slightest disturbance would impair the electrical functioning of the commutator cylinder.

My invention obviates these difficulties, it being among the objects thereof to form commutator cylinders by molding, which are mechanically strong, are free from metallic or other reinforcing members and are easy to assemble, and in which the fibres of the filler or body portion are in a predetermined relation to the direction of the stresses acting upon the commutator bars.

It is a further object of this invention to provide a method of producing molded commutators cheaply and in large quantities.

In practising my invention, I assemble a plurality of commutator bars insulated from each other by spacing members usually consisting of mica or insulating sheet material in the matrix of a mold. I provide a tube of fibrous material which I insert centrally within the assembled bars, and a number of tubes of shorter length, but of larger diameters, which I insert into the grooved side portions of the commutator bars between the centrally located tube and the extended portion of the commutator bars. The various tubes usually consist of spirally wound fibrous sheet material impregnated with a binder, such as a phenolic condensation product. The assembled structure is then subjected to heat and pressure to consolidate the material as a unitary commutator cylinder.

Figure 2:
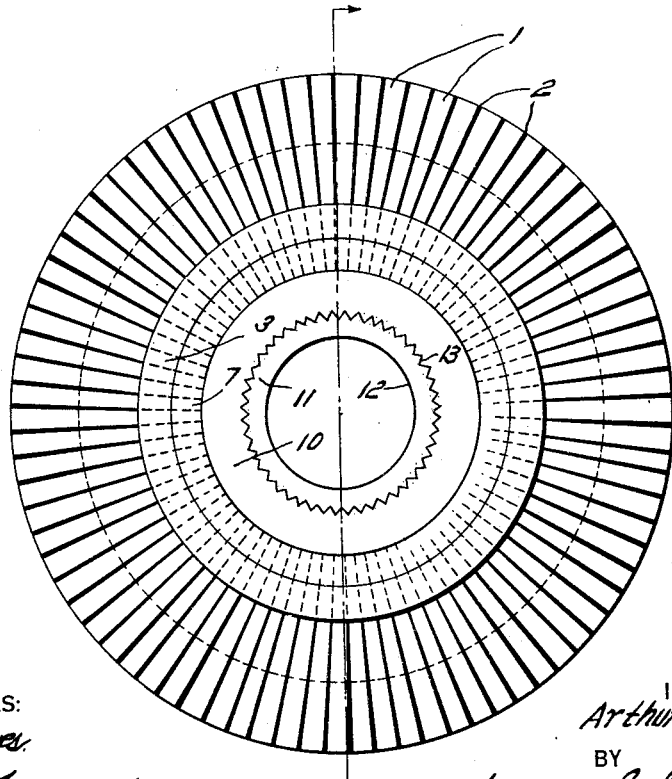

In the accompanying drawing, forming a part hereof, and in which like reference characters designate like parts, Figure 1 is a vertical, central, sectional view of a commutator cylinder, some parts being shown in elevation, and Fig. 2 is an end view thereof.

I provide a plurality of commutator bars 1, which I arrange circumferentially in the matrix of a mold (not shown). The bars are insulated from each other by thin sheets of fibrous insulating material 2 impregnated with a binder having the property of hardening under heat and pressure. I insert tubular members 3 and 4, consisting of spirally wound layers of paper impregnated with a binder, preferably a phenolic condensation product and preformed with a small amount of heat and pressure to form a coherent moldable mass, into the dovetail grooves 5 and 6 of the bars 1 and insulating material 2.

I insert similarly formed tubular rings 7 and 8 of lesser diameter than the rings 3 and 4 within the said rings so that the inside peripheries of the rings 7 and 8 are alined with the inner edges 9 of the members 1. Another tube 10 of like composite material is inserted within the tubes 7 and 8, and a metallic tube 11, having a smooth inner surface 12 and a roughened or knurled outer surface 13, is inserted in the tube 10.

The mold is closed by means of pressure plates and is inserted between the heated platens of a hydraulic press. The heat causes the binder in the tubing material to become plastic, and, by applying pressure thereto, the material is displaced into the interstices around and between the commutator bars. By prolonging the heat treatment of the binding material, it becomes hard and infusible, forming a compact and coherent unitary structure.

From the above, it will be readily seen that my invention provides a practical and simple method of forming commutators that are strong and self-sustaining and which require no metal reinforcements such as have heretofore been used. There are no weak sections radial to the centrifugal stresses acting upon the conductor bars and no lines of cleavage are possible, as is the case when a molding composition is employed.

Although I have described a specific embodiment of my invention, it will be obvious to those skilled in the art that various modification may be made in the method of construction without departing from the principles thereof. For instance, I may substitute fabric, such as cambric or duck, for the paper sheet material in forming the tubular members for the body structure, or I may employ any suitable binder, such as albumen, casein, shellac, or blood glues, in place of the phenolic condensation product. I may substitute a single tubular member chamfered at one end to fit each of the grooves 5 and 6 for the rings 3 and 7, and 4 and 8.

I claim as my invention:—

1. A molded commutator cylinder comprising a plurality of circumferentially-arranged members insulated from each other by layers of fibrous sheet material and a binder, a hollow metallic central supporting member, a fibrous tube impregnated with a heat-hardened phenolic condensation product interposed between said conductor members and said hollow metallic member and a plurality of similar fibrous tubes of shorter length inserted between said fibrous tube and said conductor members.

2. A molded commutator cylinder comprising a plurality of circumferentially-arranged alternate commutator bars and insulating members, a knurled sleeve, and a number of tubular-formed layers of paper impregnated with a heat-hardened phenolic condensation product interposed between said commutator bars and said knurled sleeve.

3. A molded commutator cylinder comprising a plurality of circumferentially-arranged alternate commutator bars and insulating members, a knurled sleeve, and a number of tubular-wound layers of fabric impregnated with a heat-hardened phenolic condensation product interposed between said commutator bars and said knurled sleeve.

4. The method of forming a molded commutator cylinder which comprises arranging a number of alternate conductor and insulating members circumferentially in the matrix of a mold, inserting a knurled sleeve in the center of said assembled structure, inserting a plurality of tubular-wound layers of sheet material impregnated with a binder between the knurled sleeve and the conductor bars and applying heat and pressure to form a unitary mass.

5. The method of forming a molded commutator which comprises assembling a plurality of commutator bars and insulating sheets impregnated with a fusible binder circumferentially in the matrix of a mold, inserting a metallic member in the center of said assembled structure, inserting a number of preformed tubular rings of fibrous sheet material impregnated with a phenolic condensation product binder between the metallic member and the commutator bars and applying heat and pressure to form a unitary mass.

In testimony whereof, I have hereunto subscribed my name this 20th day of January 1921.

ARTHUR J. BASTIAN.